United States Patent
Sakaguchi

(10) Patent No.: US 7,499,240 B2
(45) Date of Patent: Mar. 3, 2009

(54) MEDIA CARTRIDGE AUTOLOADER

(75) Inventor: Tomoaki Sakaguchi, Tama (JP)

(73) Assignees: Mitsumi Electric Co., Ltd., Tokyo (JP); Quantum Corporation, San Jose, CA (US)

( * ) Notice: Subject to any disclaimer, the term of this patent is extended or adjusted under 35 U.S.C. 154(b) by 317 days.

(21) Appl. No.: 11/280,581

(22) Filed: Nov. 16, 2005

(65) Prior Publication Data

US 2007/0058283 A1    Mar. 15, 2007

(30) Foreign Application Priority Data

Sep. 15, 2005    (JP) .............................. 2005-269193

(51) Int. Cl.
*G11B 15/68* (2006.01)
(52) U.S. Cl. ....................................................... 360/92
(58) Field of Classification Search ................. 360/92.1
See application file for complete search history.

(56) References Cited

U.S. PATENT DOCUMENTS 6,606,218 B2 *  8/2003  Collins et al. .............. 360/92.1
6,816,331 B2 *  11/2004 Porter et al. ................... 360/69
2002/0057519 A1 *  5/2002  Porter et al. .................. 360/92
2002/0057520 A1 *  5/2002  Collins et al. ................. 360/92

FOREIGN PATENT DOCUMENTS

JP        2003 45102        2/2003

\* cited by examiner

*Primary Examiner*—Mark Blouin
(74) *Attorney, Agent, or Firm*—Ladas & Parry LLP

(57) ABSTRACT

There is disclosed a media cartridge autoloader. The media cartridge autoloader includes at least one mail slot through which a media cartridge is inserted and ejected, at least one media drive into which the media cartridge is loaded, at least one media cartridge storage section that stores the media cartridge, and a media cartridge picker. The media cartridge picker includes a turntable that supports the media cartridge and rotates to change the orientation of the media cartridge, a turntable rotating mechanism that rotates the turntable, and a media cartridge transporter that transports the media cartridge between the turntable and one of the mail slot, the media drive and the cartridge storage section. The turntable is provided with a media cartridge stopper member that stops the media cartridge inserted manually from the mail slot.

9 Claims, 17 Drawing Sheets

MEDIA CARTRIDGE AUTOLOADER

BACKGROUND OF THE INVENTION

1. Field of the Invention

The present invention generally relates to a media cartridge autoloader, and particularly relates to a media cartridge picker that moves a media cartridge in a media cartridge autoloader serving as a data storage unit.

2. Description of the Related Art

A typical media cartridge autoloader includes a media cartridge picker in the center, a mail slot at the front side, a read/write media drive at the rear side, and media cartridge transport magazines disposed one at each lateral side. The media cartridge picker is configured to transport a media cartridge between the mail slot, the media drive, and the media cartridge transport magazines.

When the media cartridge autoloader is turned on, the media cartridge picker is initialized to rotate the turntable to a home position thereof. The media cartridge is then manually inserted from the mail slot by an operator. Then, the media cartridge picker starts operations.

SUMMARY OF THE INVENTION

According to one aspect of the present invention, there is provided a media cartridge autoloader comprising at least one mail slot through which a media cartridge is inserted and ejected, at least one media drive into which the media cartridge is loaded, at least one media cartridge storage section that stores the media cartridge, and a media cartridge picker. The media cartridge picker includes a turntable that supports the media cartridge and rotates to change the orientation of the media cartridge, a turntable rotating mechanism that rotates the turntable, and a media cartridge transporter that transports the media cartridge between the turntable and one of the mail slot, the media drive and the cartridge storage section.

In certain embodiments, the turntable is provided with a media cartridge stopper member capable of stopping the media cartridge inserted manually from the mail slot. The media cartridge stopper member can include a shaft and a main body section having a rectangular shape. In this embodiment, the main body section includes a first side surface to stop a further insertion of the media cartridge when the media cartridge is manually inserted and brought into contact with the first side surface, and a second side surface adjacent to the first side surface to permit the further insertion of the media cartridge. The shaft can also include a first shaft portion formed along a third side surface of the main body section that opposes the first side surface and is adjacent to the second side surface, and second and third shaft portions projecting from the opposing ends of the first shaft portion. The media cartridge stopper member can be attached by engaging the second and third shaft portions with the turntable.

DETAILED DESCRIPTION OF THE PREFERRED EMBODIMENT

An exemplary embodiment of the present invention is described hereinafter with reference to the accompanying drawings.

First Embodiment

The description of a first embodiment includes the following:

1. Configuration and Operations Overview of Tape Cartridge Autoloader 100
2. Configuration and Operations of Tape Cartridge Picker 102
3. Configuration of Tape Cartridge Stopper Mechanism 220
4. Operations of Tape Cartridge Stopper Mechanism 220

1 [Configuration and Operations Overview of Tape Cartridge Autoloader 100]

Figure 1:
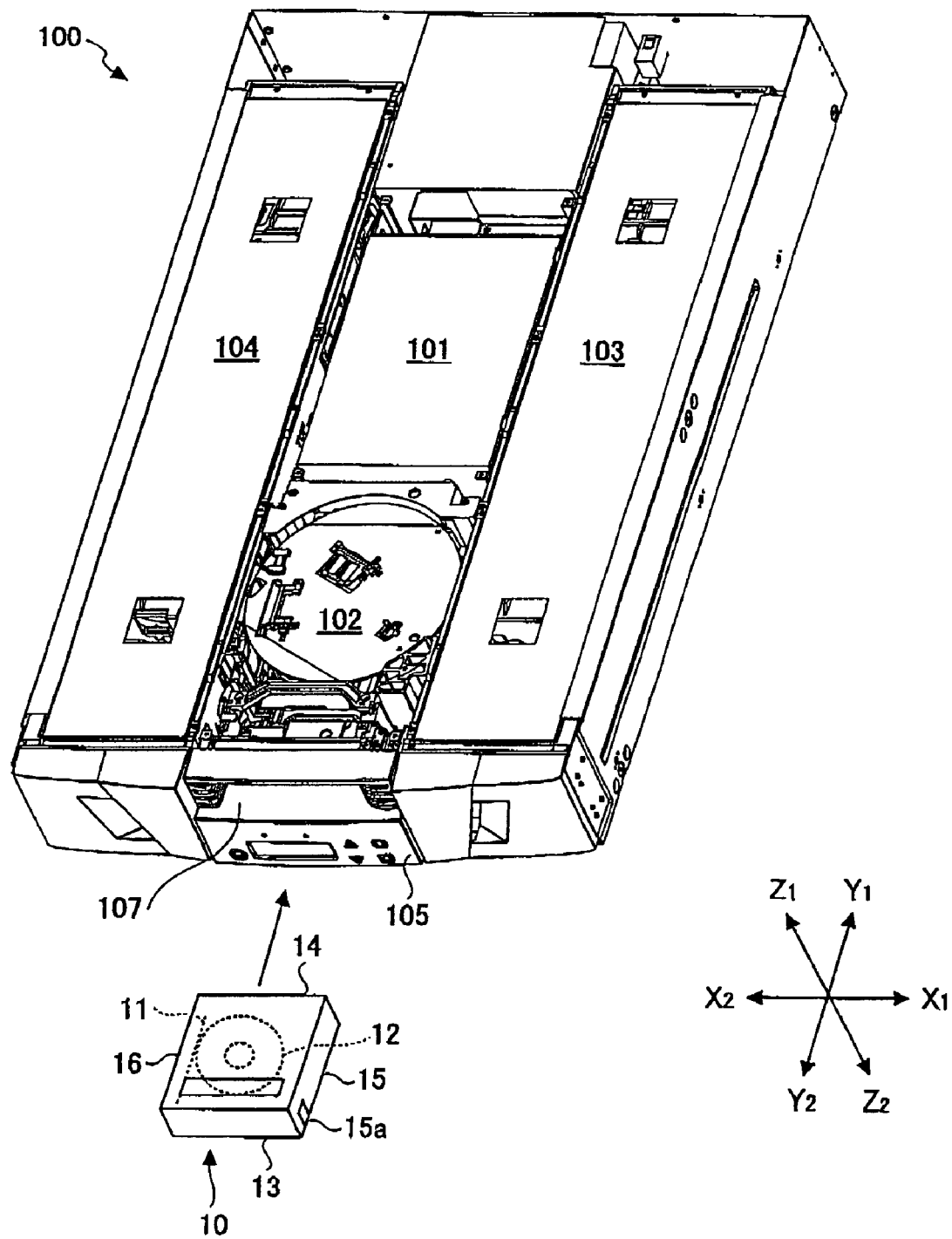
FIG. 1 is a perspective view illustrating a media cartridge autoloader with an upper cover thereof removed according to a first embodiment of the present invention.

FIG. 1 is a perspective view illustrating a tape cartridge autoloader 100 with an upper cover thereof removed according to the first embodiment of the present invention. In the embodiments illustrated in the figures, the media cartridge autoloader is used with one or more tape cartridges, and is therefore referred to as a tape cartridge autoloader. It is recognized, however, that although the following description and the figures provided herein pertain particularly to an autoloader used for tape cartridges, any other suitable type of media cartridge can equally be used with the present invention, such as an optical disk cartridge, as one non-exclusive example. The embodiments disclosed herein are not intended to limit the scope of the present invention in any manner to use with tape cartridges or any other particular type of media. In other words, it is understood that the term "tape" as used herein can equally be substituted for the term "media".

Figure 2:
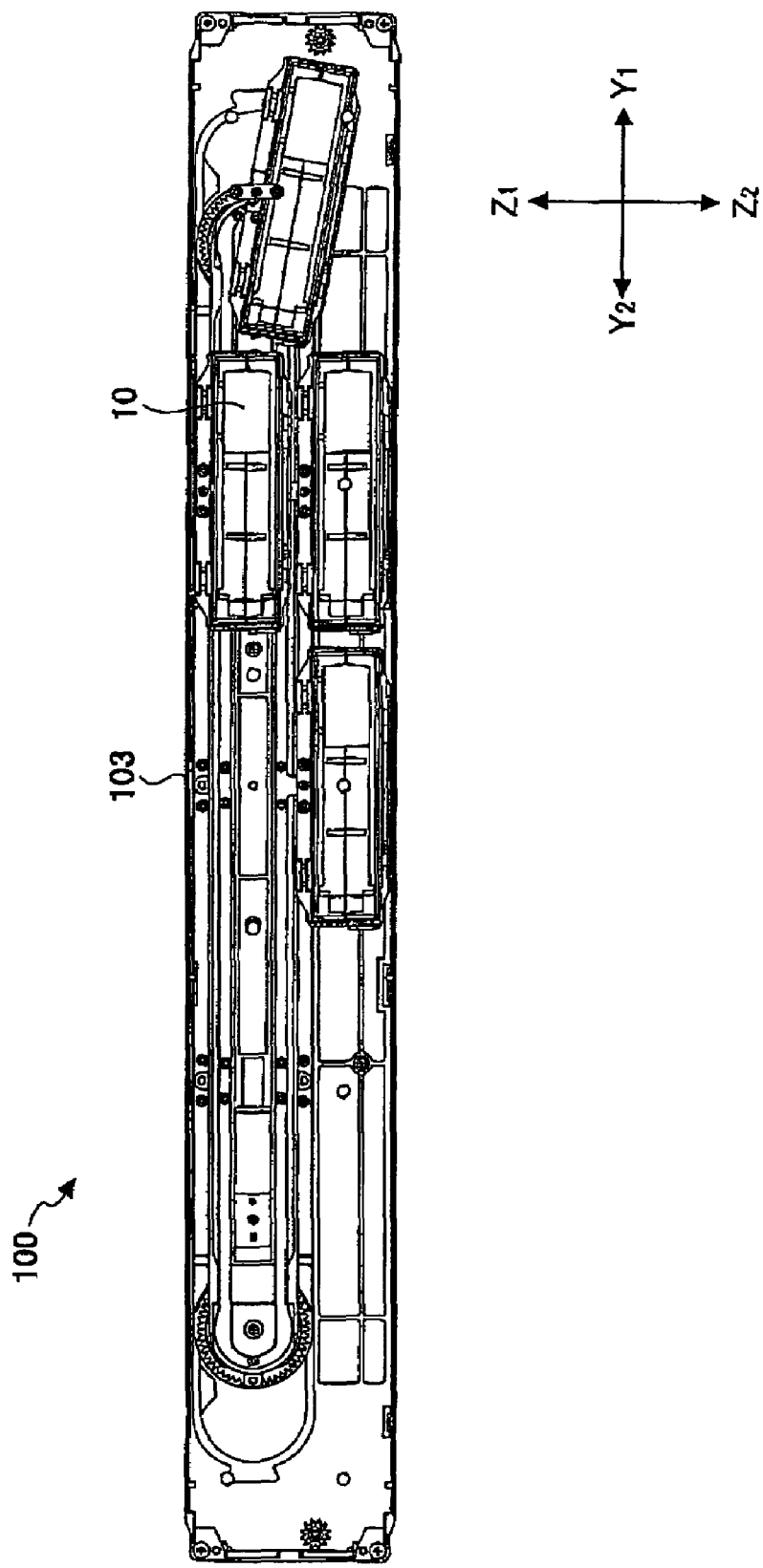
FIG. 2 is a side view illustrating the media cartridge autoloader of FIG. 1 with a side cover thereof removed.

FIG. 2 is a side view illustrating the tape cartridge autoloader 100 with a side cover thereof removed. Throughout the drawings, the width direction is indicated by a line X1-X2, the depth direction is indicated by a line Y1-Y2, and the height direction is indicated by a line Z1-Z2.

In one embodiment, the tape cartridge autoloader 100 generally includes a control panel 105, a mail slot 107, both on a front panel, a tape cartridge picker 102 at a position opposing the mail slot 107, tape cartridge transport magazines 103 and 104 located on the X1 and X2 side, respectively, and a tape drive 101 on the Y1 side of the tape cartridge picker 102. Alternatively, the structures included in the autoloader 100 can be positioned and/or oriented in other suitable locations. A suitable tape cartridge 10 is applied to the tape cartridge autoloader 100. Non-exclusive examples of suitable tape cartridges include Digital Linear Tape (DLT) cartridges, Super Digital Linear Tape (SDLT) cartridges and Linear Tape Open (LTO) cartridges.

Referring to FIG. 1, the tape cartridge 10 includes a magnetic tape 11 wound on a reel 12 therein such that the magnetic tape 11 is pulled out from a rear face of the tape cartridge 10. The tape cartridge 10 includes a front face 13, a rear face 14, side faces 15 and 16, and a notch 15a formed on the side face 15 which a cartridge pin (described below) engages.

The tape cartridge transport magazines 103 and 104 are each configured to store plural tape cartridges 10 in an orientation in which the front faces 13 oppose the tape cartridge picker 102. The tape cartridge transport magazines 103 and 104 can also transport the tape cartridges 10 along a racetrack path elongated in the Y1-Y2 direction (FIG. 2).

The tape drive 101 is operable to read and/or write data from or to the magnetic tape 11 pulled out from the loaded tape cartridge 10. The tape drive 101 includes a tape cartridge ejecting mechanism (not shown). The tape drive 101, which may be selected from tape drives having different heights available from various manufacturers, is attached to the tape cartridge autoloader 100. For this operation, the tape cartridge picker 102 is provided with a turntable lifting mechanism 150 (described below).

Figure 3:
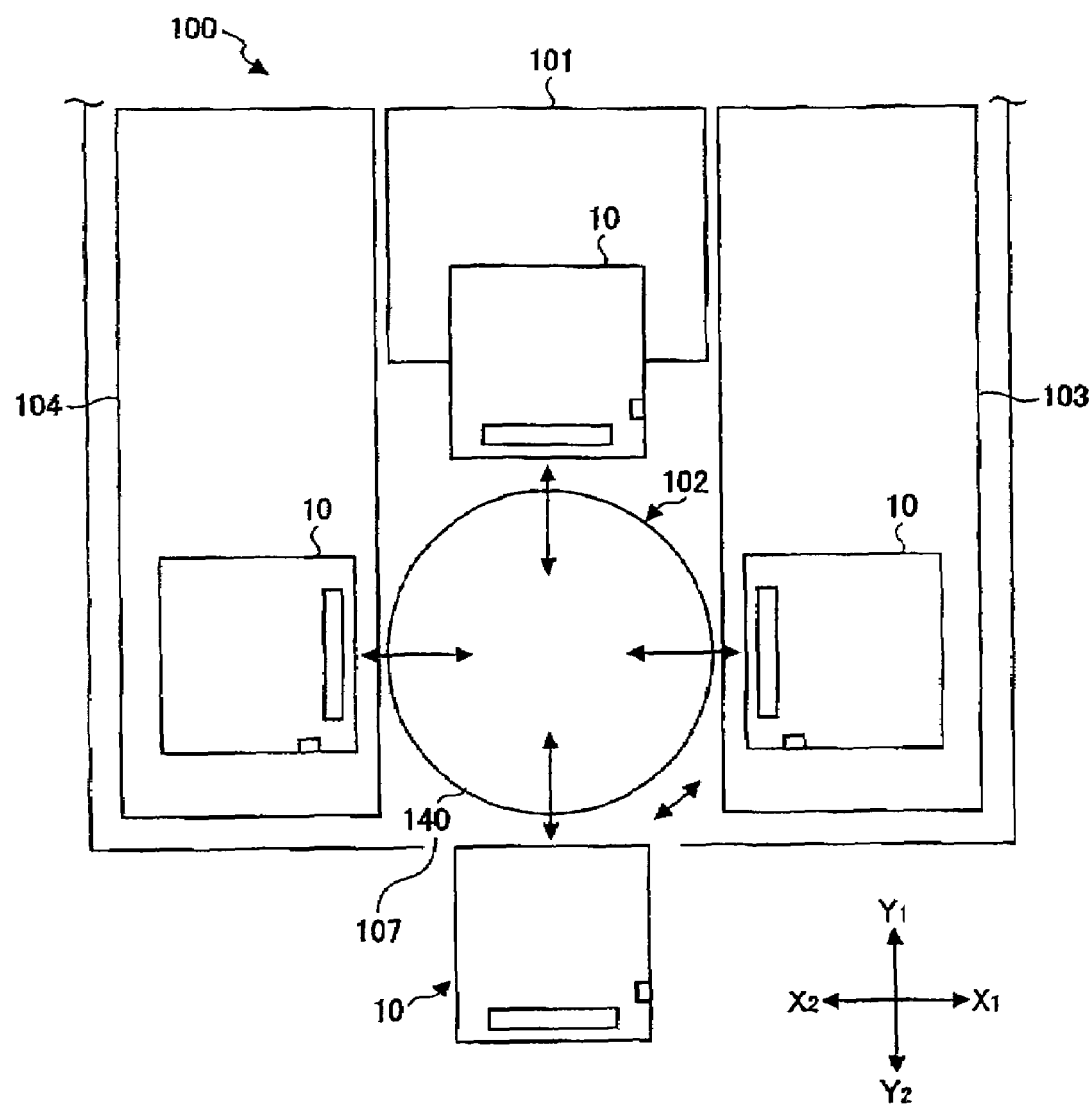
FIG. 3 is a schematic illustration showing operations of a media cartridge picker.

Referring to FIG. 3, the tape cartridge picker 102 is configured to transport the tape cartridge 10 into or out of a turntable 140 for operations such as loading the tape cartridge 10 inserted through the mail slot 107 into the tape drive 101, retrieving the tape cartridge 10 from the tape cartridge transport magazines 103 and 104 to load the tape cartridge 10 onto the tape drive 101, retrieving the tape cartridge 10 from the tape drive 101 to return the tape cartridge 10 to one of the tape cartridge transport magazines 103 and 104, and ejecting the tape cartridge 10 through the mail slot 107. The tape cartridge picker 102 is also configured to rotate the turntable 140 by a predetermined rotational increment, such as by approximately 90-degree increments, for example, although it is recognized that the predetermined rotational increment can be less than or greater than 90 degrees based on the design requirements of the autoloader 100. Further, the tape cartridge picker 102 can also raise/lower the turntable 140 as necessary. When the turntable 140 is rotated, the orientation of the tape cartridge 10 is changed.

2 [Configuration of Tape Cartridge Picker 102]

Figure 4:
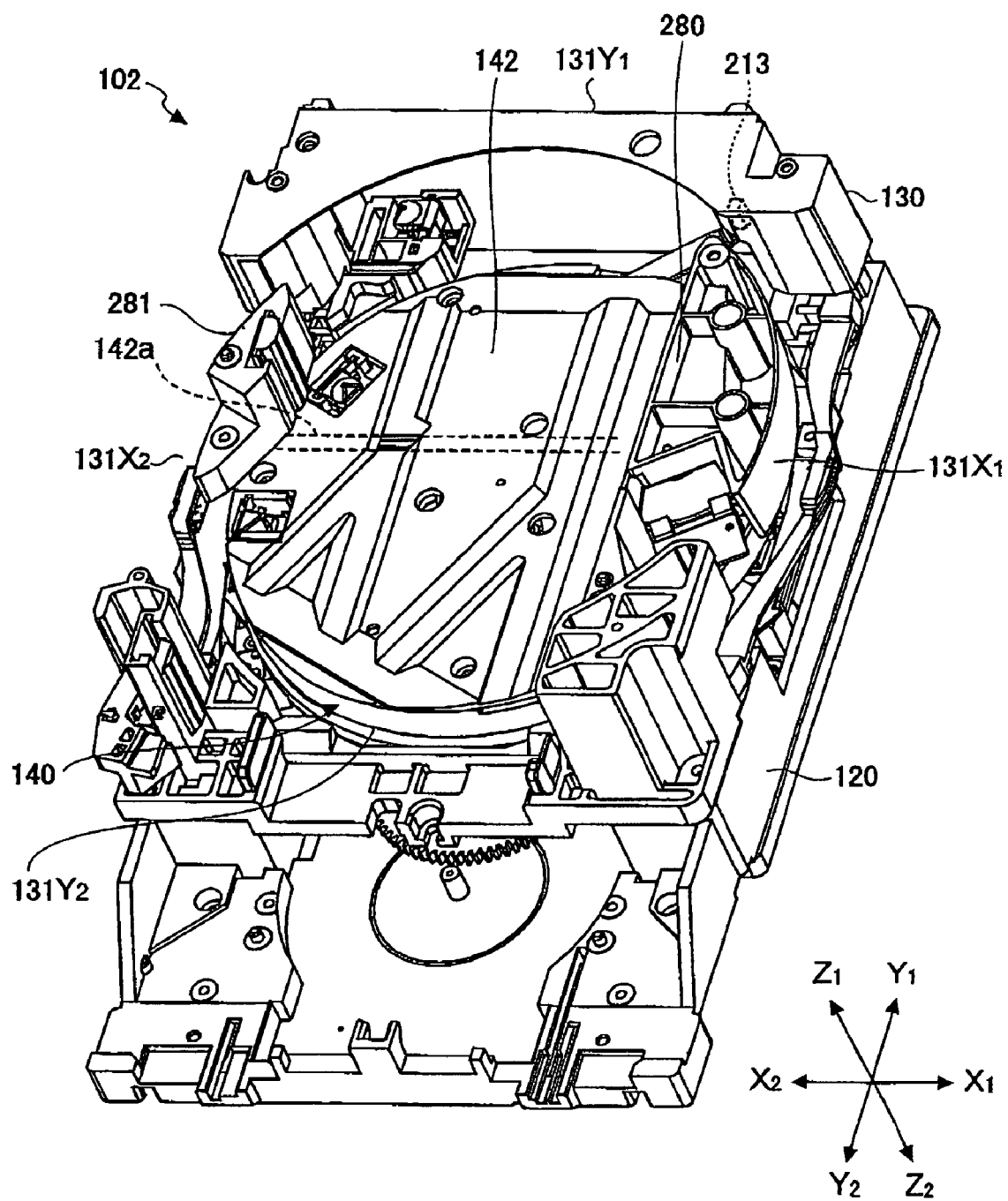
FIG. 4 is a perspective view illustrating the media cartridge picker.
Figure 5:
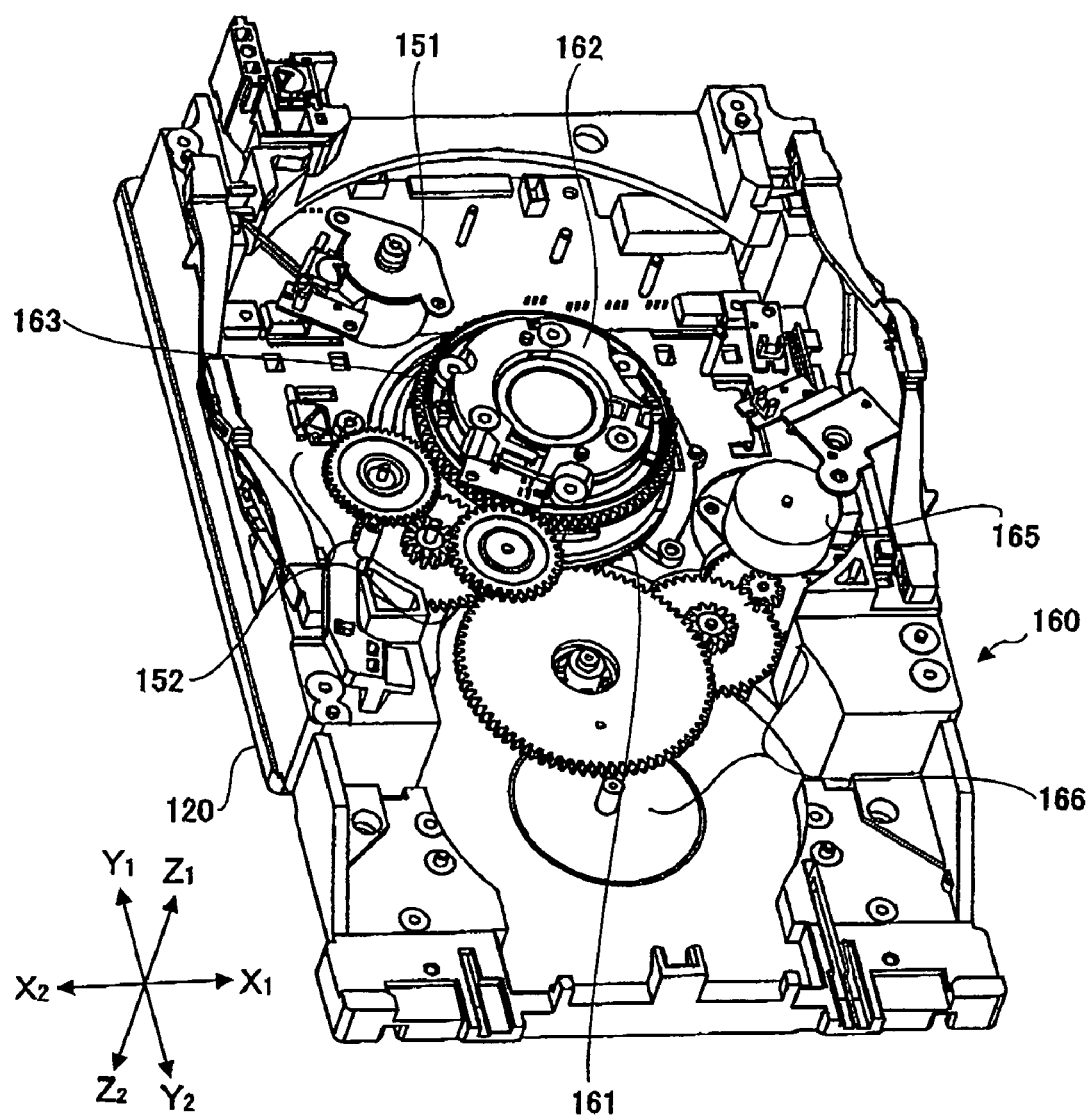
FIG. 5 is a perspective view illustrating the media cartridge picker with a pillar and a turntable removed.
Figure 6:
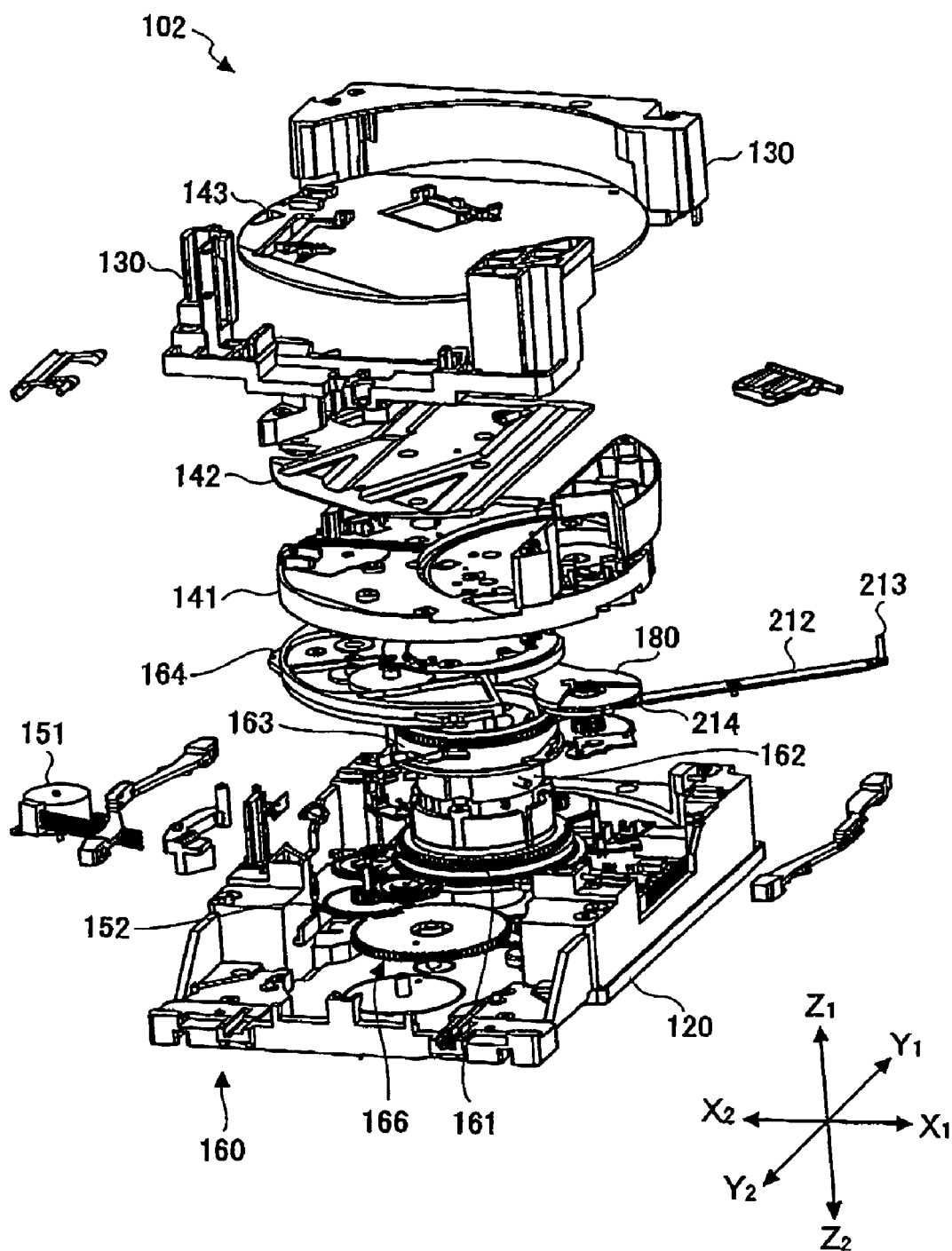
FIG. 6 is an exploded perspective view illustrating the media cartridge picker.
Figure 7:
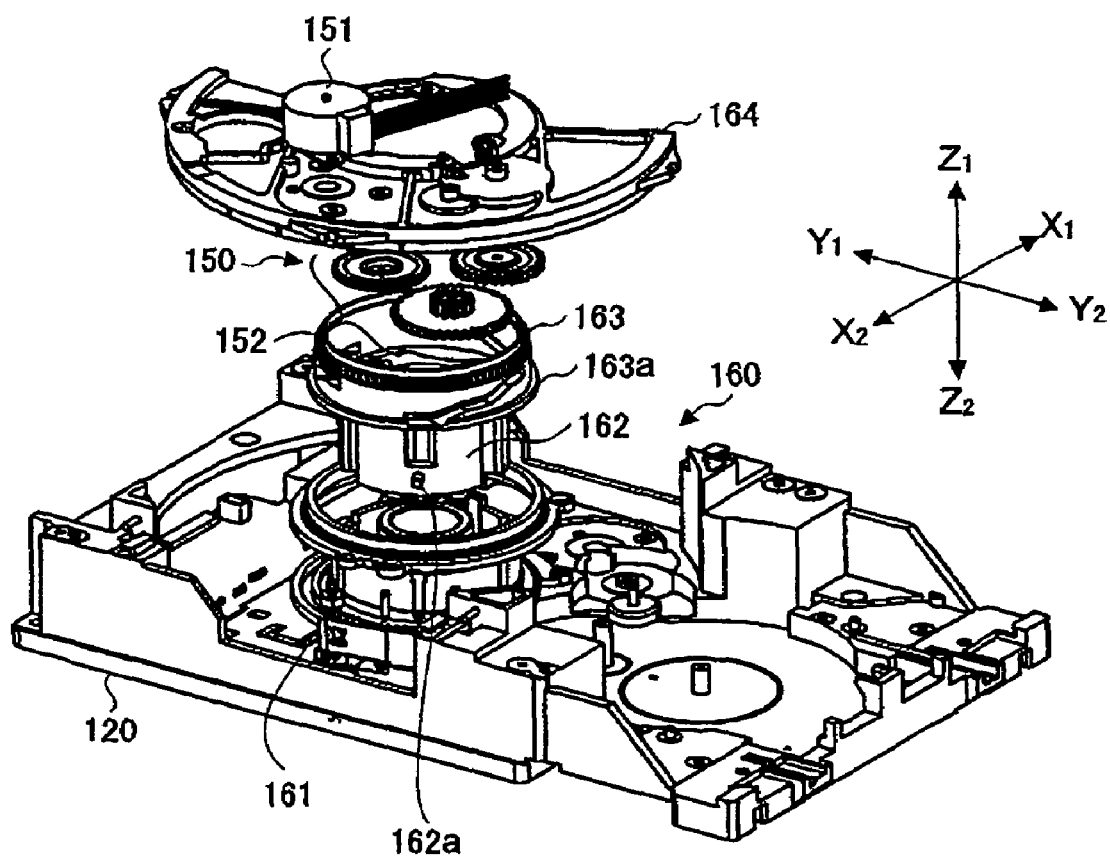
FIG. 7 is an exploded perspective view illustrating a turntable lifting mechanism of FIG. 6 in detail.

FIG. 4 illustrates the tape cartridge picker 102 with a top plate 143 of the turntable 140 removed. FIG. 5 illustrates the tape cartridge picker 102 with a pillar 130 and the turntable 140 removed. FIG. 6 is an exploded perspective view illustrating the tape cartridge picker 102. FIG. 7 illustrates the turntable lifting mechanism 150 in detail.

Referring to FIG. 4, the tape cartridge picker 102 (FIG. 1) includes a base 120, the pillar 130 mounted on the base 120, the turntable 140 configured to support the tape cartridge 10, the turntable lifting mechanism 150 (FIG. 7) configured to slightly raise and lower the turntable 140 for height position adjustment, and a turntable rotating mechanism 160 (FIG. 5) configured to rotate the turntable 140 in approximately 90-degree increments, or another suitable rotational increment. The tape cartridge picker 102 has ports 131X1, 131X2, 131Y1, and 131Y2 on four sides thereof.

In one embodiment, a rotating ring gear 161, a cylindrical stand 162, a lifting ring gear 163, and a sub base 164 are disposed on the base 120. The rotating ring gear 161 is rotatably attached on the base 120. The cylindrical stand 162 is arranged at the inner side of the rotating ring gear 161 and the lifting ring gear 163 so as to be rotated along with the rotating ring gear 161 and be raised independently from the rotating ring gear 161. The lifting ring gear 163 is arranged at the upper side of the rotating ring gear 161 so as to be rotated independently from the rotating ring gear 161. A boss 162a (FIG. 10) of the cylindrical stand 162 is configured to engage a diagonal groove 163a of the lifting ring gear 163. The cylindrical stand 162 is rotated by rotation of the rotating ring gear 161, and raised/lowered by rotation of the lifting ring gear 163. The sub base 164 is a semi-circular plate fixed to a position slightly separated from and at the upper side of the base 120.

Figure 8A:
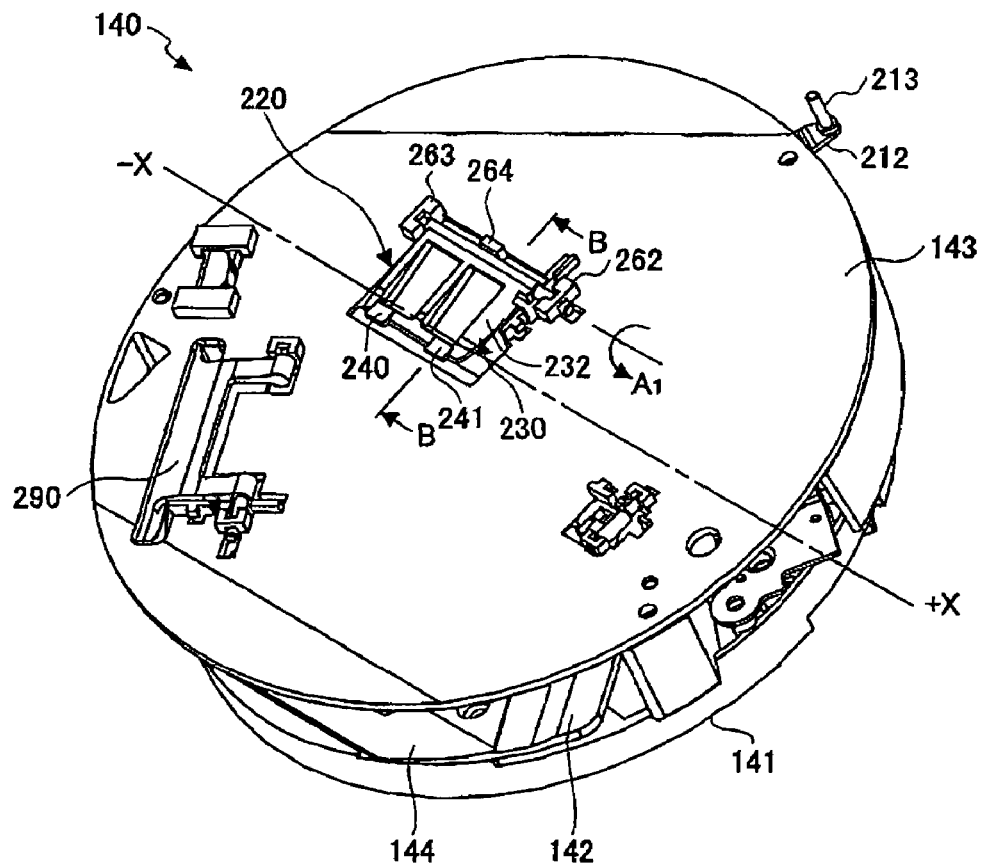
FIG. 8A is a perspective view illustrating a turntable.

Referring to FIG. 8A, the turntable 140 includes a base plate 141, a floor plate 142, the top plate 143, with a clearance 144 between the floor plate 142 and the top plate 143 to accommodate the tape cartridge 10. The base plate 141 is screwed onto the cylindrical stand 162 (FIG. 7). The turntable 140 is provided with a cartridge transporter 170 and a tape cartridge stopper mechanism 220, which are described below in greater detail.

Referring to FIG. 7, the lifting mechanism 150 includes a stepping motor 151, a gear train 152, and the lifting ring gear 163. Both the stepping motor 151 and the gear train 152 are provided on the sub base 164.

As shown in FIGS. 5-7, the turntable rotating mechanism 160 includes a stepping motor 165, a reduction gear train 166, and the rotating ring gear 161, all of which are provided on the base 120.

In one embodiment, the lifting mechanism 150 has a function of initializing the turntable 140 by raising/lowering the turntable 140 to a home position thereof in the Z direction. The turntable rotating mechanism 160 has a function of initializing the turntable 140 by rotating the turntable 140 to the home position in the rotation direction. The home position of the turntable 140 is a position where a y-axis (described later) becomes parallel to the aforesaid Y-axis. The lifting mechanism initialization operation and the turntable rotating mechanism initialization operation apply a method of moving an object to an operation end position defined as a reference position, and then moving the object back by a predetermined distance. The same method is applied to operations for initializing the cartridge transporter 170 (described below).

Figure 9:
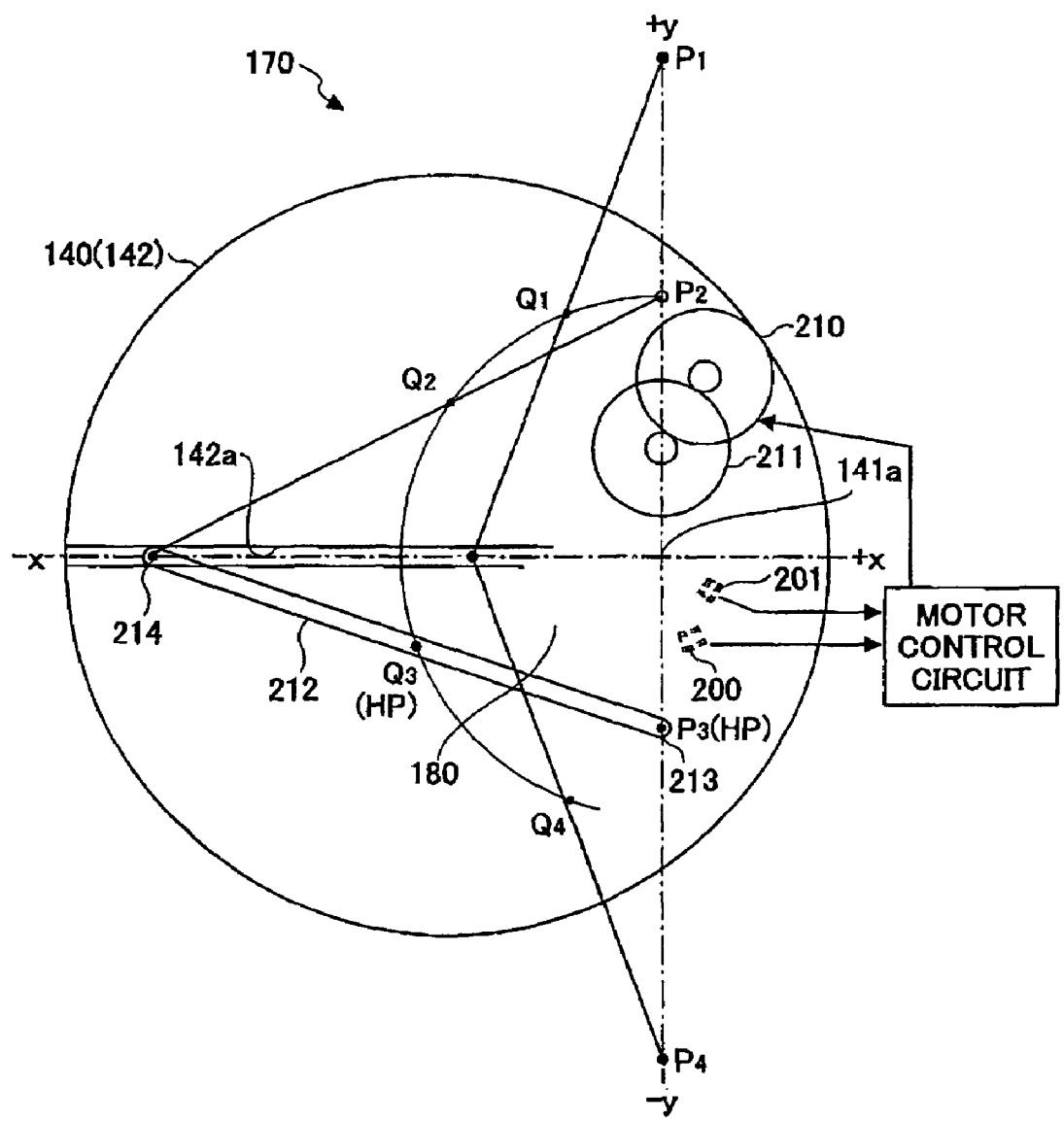
FIG. 9 is a schematic illustration showing a media cartridge transport mechanism.

Referring to FIG. 9, coordinates are applied to the turntable 140, wherein the position of a pin 141a (to be described below) is defined as the origin, a guide groove 142a (to be described below) is defined as an x-axis, and an axis passing through the origin and being orthogonal to the x-axis is defined as a y-axis.

The cartridge transporter 170 and a stepping motor 210 (described later), both shown in FIG. 9, are provided on the base plate 141.

The cartridge transporter 170 has a function of moving the tape cartridge 10 between a position inside the turntable 140, i.e., a position inside the clearance 144, and a position outside the tape cartridge picker 102. In one embodiment, this movement can be substantially linear. In an alternative embodiment, the movement can be non-linear, such as arcuate or some other suitable non-linear movement that can depend upon the design requirements of the autoloader 100. The cartridge transporter 170 includes a rotary arm 180 rotatably attached to the pin 141a formed on the base plate 141, the stepping motor 210 (FIG. 9) configured to bi-directionally rotate the rotary arm 180 between positions Q1 and Q4 within a predetermined angular range, a reduction gear mechanism 211 configured to transmit the rotation of the motor 210 at a reduced rotation rate to the rotary arm 180, and a lever 212 with a center part rotatably connected to a tip end of the rotary arm 180. A cartridge pin 213 is vertically fixed to an end of the lever 212, while a pin 214 is fixed to the other end of the lever 212. The pin 214 engages a guide groove 142a formed on a lower face of the floor plate 142. In the embodiment illustrated in FIG. 10, the guide groove 142a is substantially linear. However, in an alternative embodiment, the guide groove 142a can have a non-linear configuration.

3 [Configuration of Tape Cartridge Stopper Mechanism 220]

Figure 10:
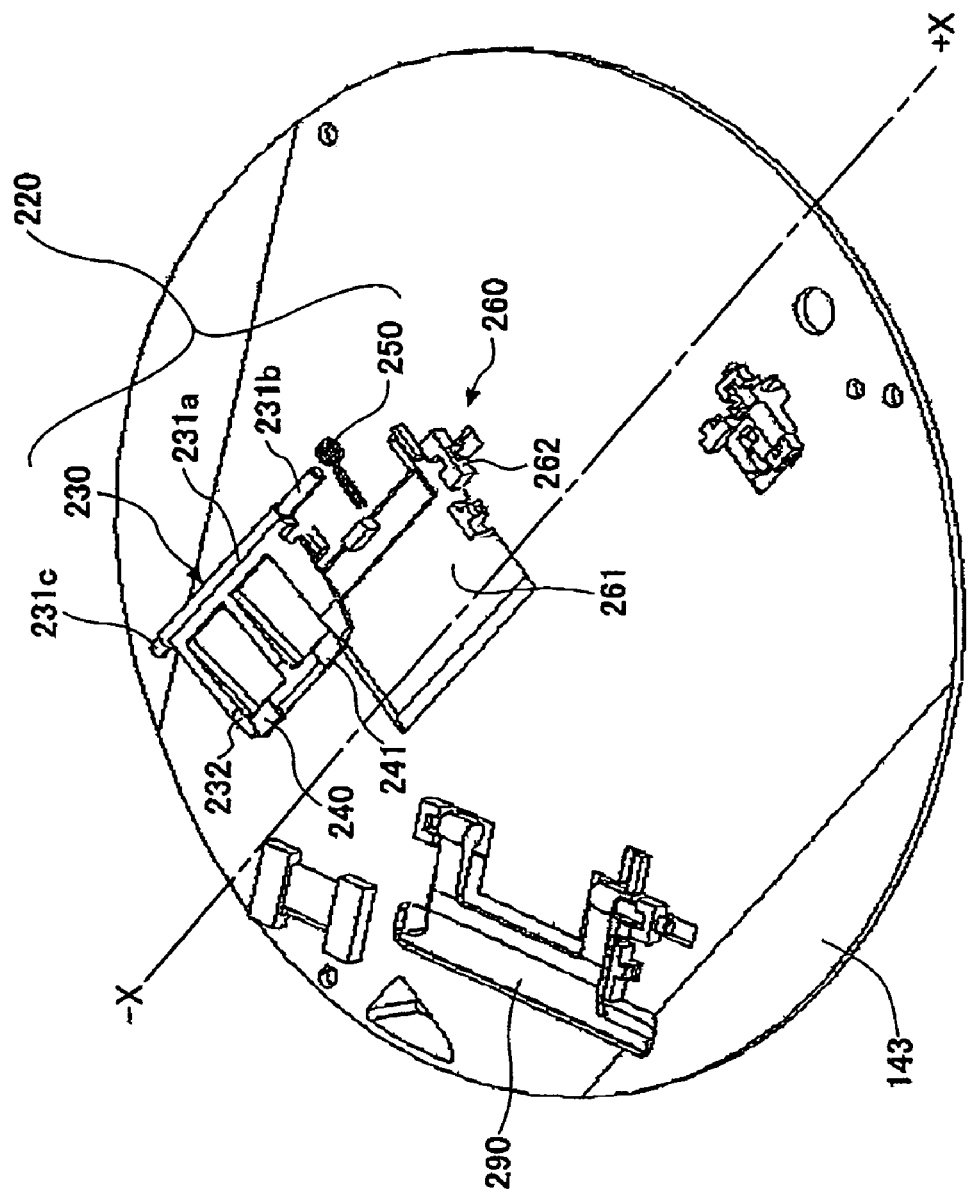
FIG. 10 is an exploded perspective view illustrating a media cartridge stopper mechanism.
Figure 11:
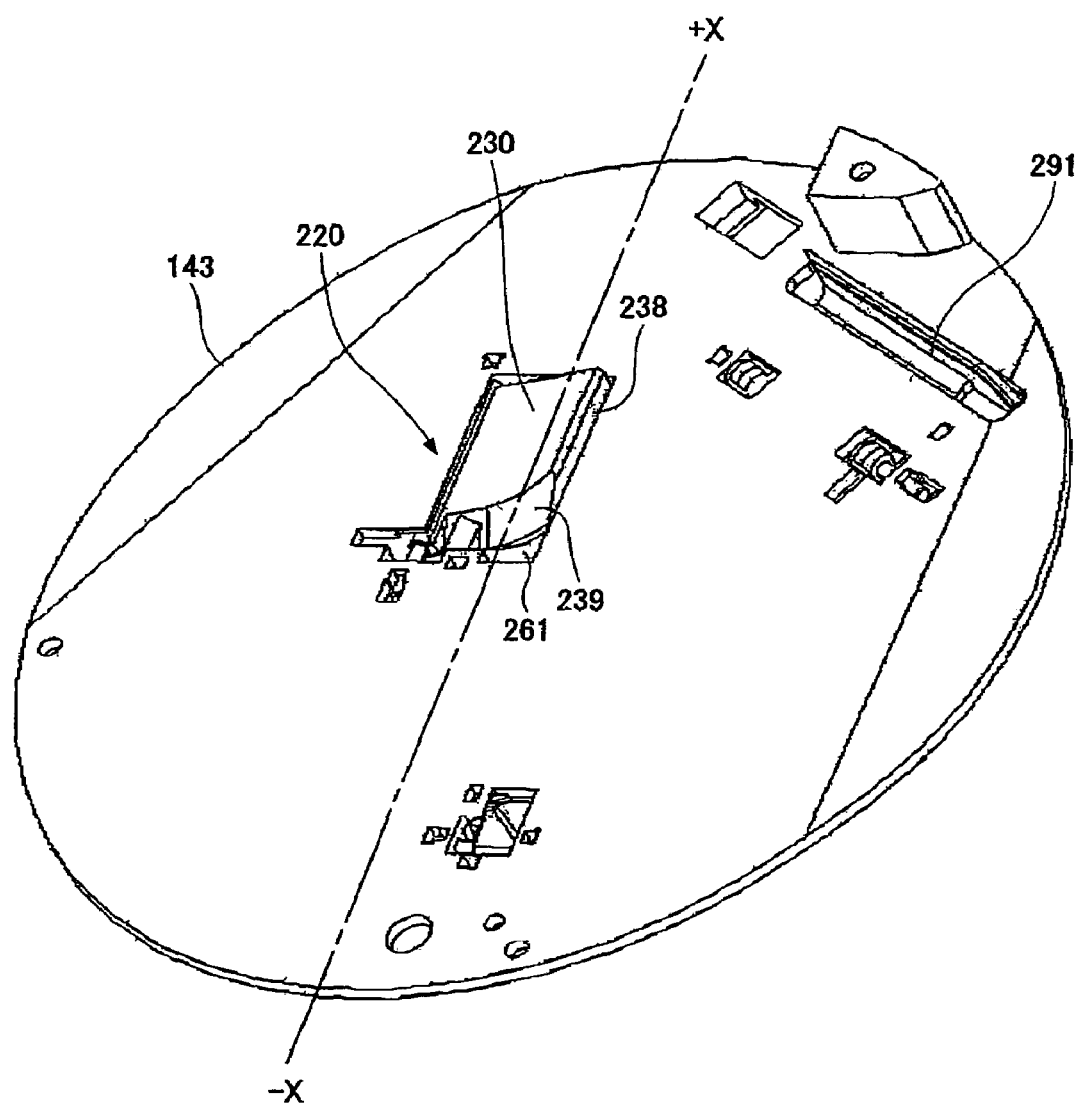
FIG. 11 is a perspective view illustrating the media cartridge stopper mechanism, viewed from the opposite side of a top plate shown in FIG. 11.

FIG. 10 is an exploded perspective view illustrating the tape cartridge stopper mechanism 220. FIG. 11 is a perspective view illustrating the opposite side of the top plate 143 of FIG. 11.

The tape cartridge stopper mechanism 220 includes a tape cartridge stopper member 230 attached on the top plate 143, and a torsion coil spring member 250.

The tape cartridge stopper member 230 can be formed from any suitably rigid or resilient material. In one non-exclusive embodiment, for example, the tape cartridge stopper member 230 is formed from a synthetic resin molded product. The tape cartridge stopper member 230 includes a shaft 231, and a main body section 232 extending from the shaft 231 as shown in FIGS. 11 and 12A-12D.

In one embodiment, the shaft 231 includes a first shaft portion 231a formed along a rear surface of the main body section 232, and second and third shaft portions 231b and 231c projecting from the opposing ends of the first shaft portion 231a.

Figure 12C:
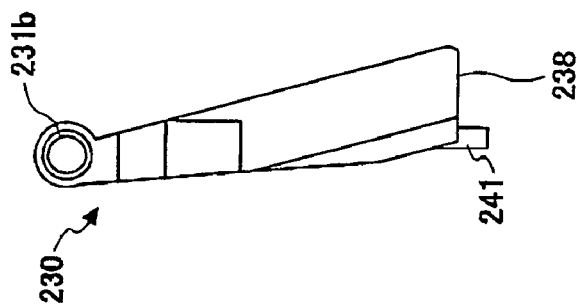
FIGS. 12A-12D are illustrations each showing a media cartridge stopper member.
Figure 12A:
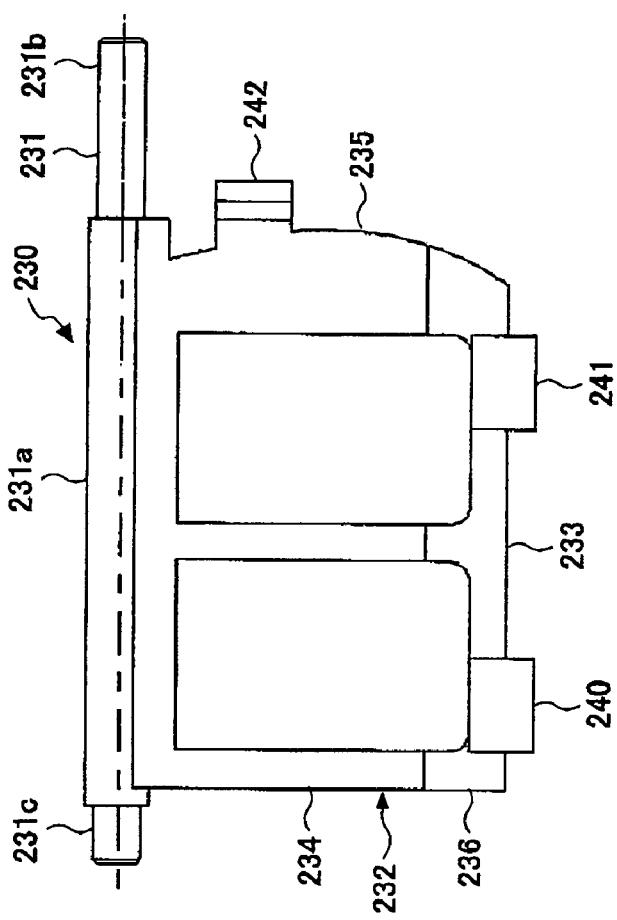
Figure 12B:
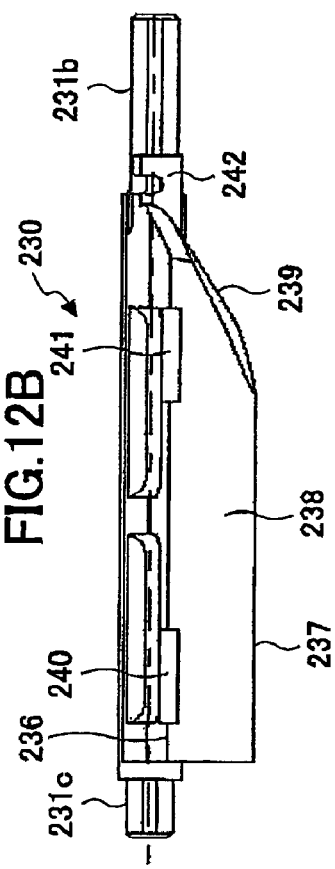
Figure 12D:
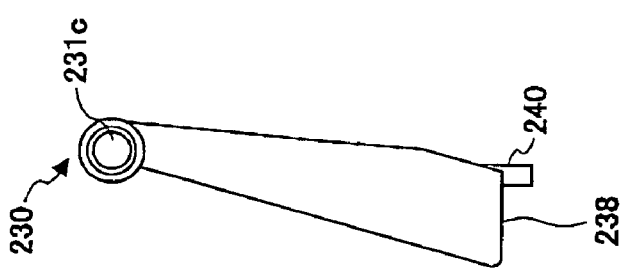

Referring to FIG. 12A, the main body section 232 includes a front edge 233, side edges 234 and 235 at opposite sides thereof, and upper and lower faces 236 and 237 (FIG. 12B), respectively. Referring to FIG. 12B, the main body section 232 further includes a vertical side face 23B as a first side surface at the front edge 233, and an inclined face 239 as a second side surface extending from the corner between the front side edge 233 and the right side edge 235 along the right side edge 235 as well as extending from the upper face 236 to the lower face 237 while inclining toward the center of the main body section 232.

In the embodiment illustrated in FIGS. 12A-12D, the main body section 232 further includes two projecting portions 240 and 241 projecting from the front edge 233, and a projecting portion 242 projecting from the side edge 235 at the same level as the upper face 236.

Referring to FIG. 10, the top plate 143 includes a attachment section 260 in which the tape cartridge stopper member 230 is attached. The attachment section 260 includes an opening 261 of a size corresponding to the main body section 232, bearing portions 262 and 263 (FIG. 8A), and a holder portion 264 formed adjacent to the opening 261 on an upper face of the top plate 143.

Figure 8B:
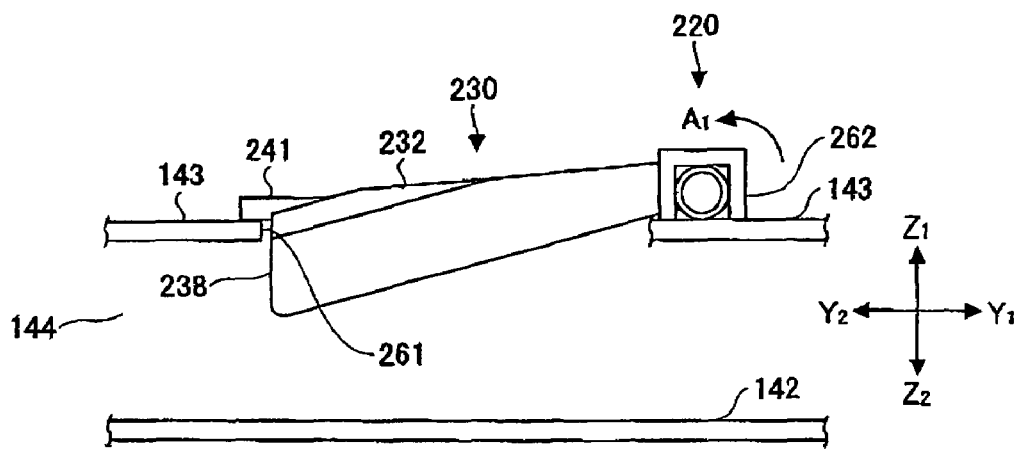
FIG. 8B is an enlarged cross-sectional view illustrating a media cartridge stopper mechanism.

Reference to FIGS. 8A and 8B, the tape cartridge stopper member 230 can be directly or indirectly attached or coupled to the top plate 143 with the second shaft portion 231b engaging the bearing portion 262, the third shaft portion 231c engaging the bearing portion 263, the first shaft portion 231a supported by the holder portion 264, and the main body section 232 engaging the opening 261. In this way, the tape cartridge stopper member 230 is directly attached to the top plate 143 without the use of additional component parts. FIG. 8B is an enlarged cross-sectional view as taken along line B-B of FIG. 8A.

In the embodiment shown in FIG. 10, the torsion coil spring member 250 engages the second shaft portion 231b while being held by the top plate 143 and the projecting portion 242. The tape cartridge stopper member 230 is biased in A1 direction (FIG. 8B) with a spring force of the spring member 250. The projecting portions 240 and 241 are held on the edge of the opening 261 formed in the top plate 143 while the main body section 232 at the side of the front edge 233 projects toward the lower side of the top plate 143.

In one embodiment, the top plate 143 is fixed with respect to the base plate 141 and the floor plate 142 such that a direction in which the bearing portions 262 and 263 and the holder portion 265 are aligned, i.e., the axial direction of the shaft 231 can be aligned with an x-axis as shown in FIG. 9.

4 [Operations of Tape Cartridge Stopper Mechanism 220]

Figure 17A:
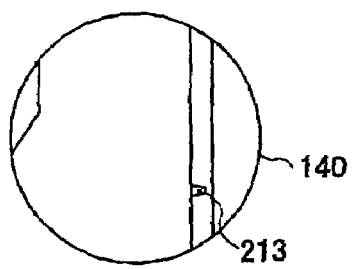
FIGS. 17A-17F illustrate operations of the media cartridge picker for transporting the media cartridge, inserted from a mail slot, into the turntable.

When the tape cartridge autoloader 100 is turned on, the tape cartridge picker 102 is initialized. In one embodiment, during the initialization operations, the turntable 140 can be rotated to a position shown in FIG. 17A, and then rotated by a predetermined rotational increment, such as by approximately 30 degrees counterclockwise, for example, to reach a home position shown in FIG. 17B. Insertion of the tape cartridge 10 from the mail slot 107 is unimpeded in this state. In this state, the turntable 140 can be said to be positioned at a first rotational angle. The first rotational angle can be rotation of the turntable 140 any suitable increment in either direction. In one embodiment, the first rotational angle is between zero and 180 degrees. In another embodiment, the first rotational angle is between 10 degrees and 90 degrees. In another embodiment, the first rotational angle is between 15 and 60 degrees. In yet another embodiment, the first rotational angle is between 20 degrees and 45 degrees.

Figure 13A:
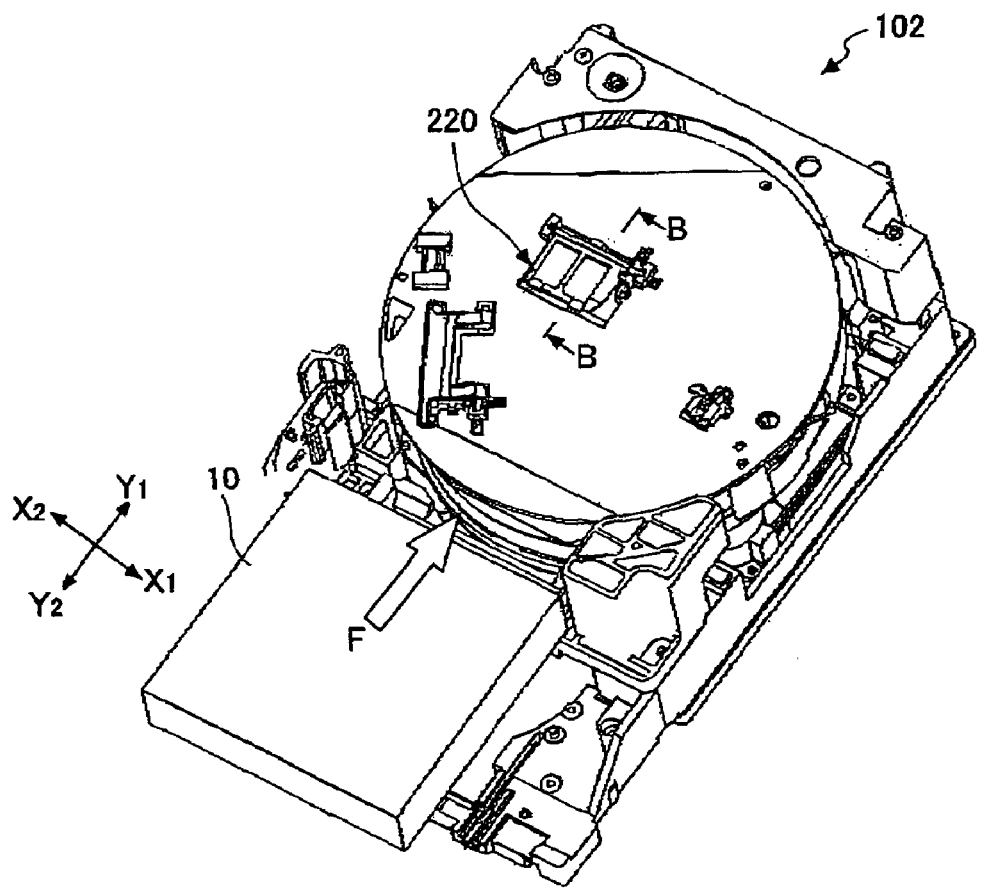
FIGS. 13A and 13B illustrate the state of the media cartridge stopper mechanism at the time when manual insertion of media cartridge is started.
Figure 13B:
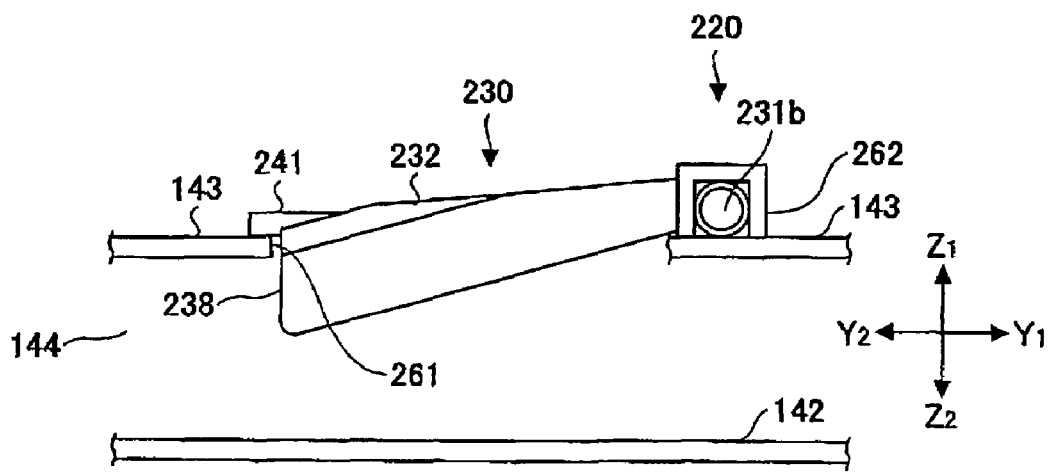

FIG. 13A illustrates the tape cartridge picker 102 with the tape cartridge 10 being inserted through the mail slot 107. FIG. 13B is an enlarged cross-sectional view as taken along line B-B of FIG. 13A. The tape cartridge stopper member 230 is oriented such that the vertical side face 238 formed at the front edge 233 faces the Y2 side, i.e., the mail slot 107.

Figure 14A:
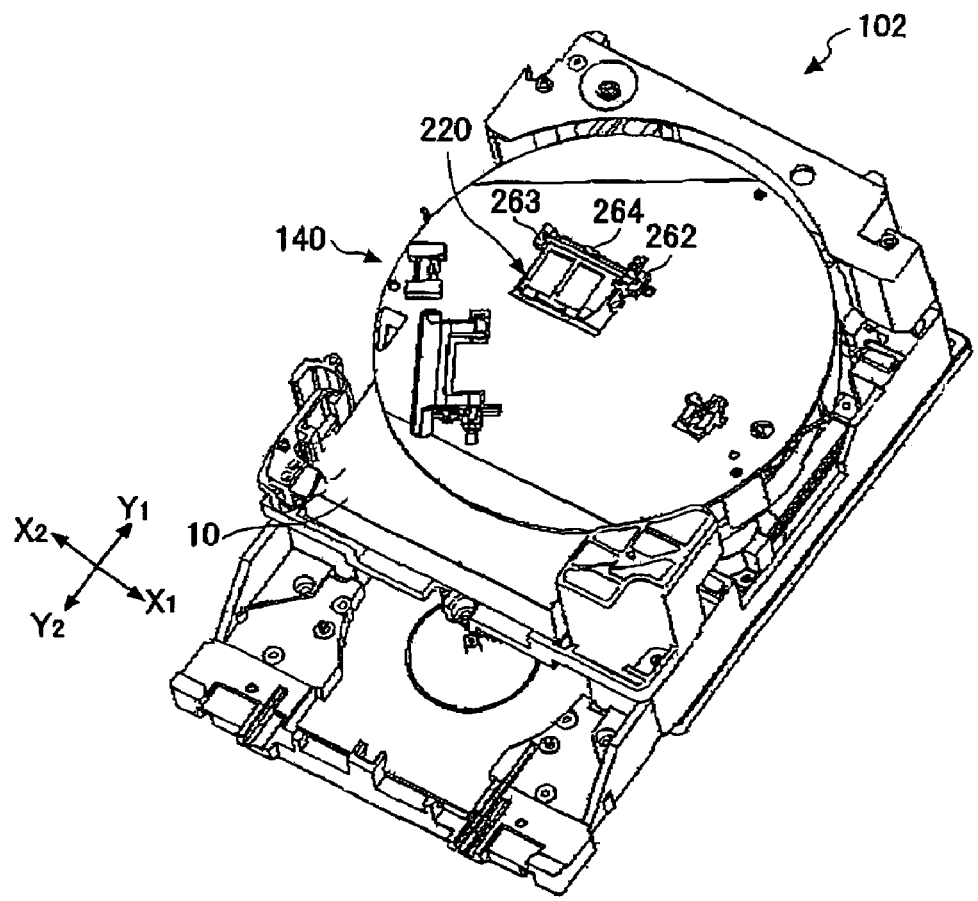
FIGS. 14A and 14B illustrate the state of the media cartridge stopper mechanism at the time when the manual insertion of a media cartridge is stopped.
Figure 14B:
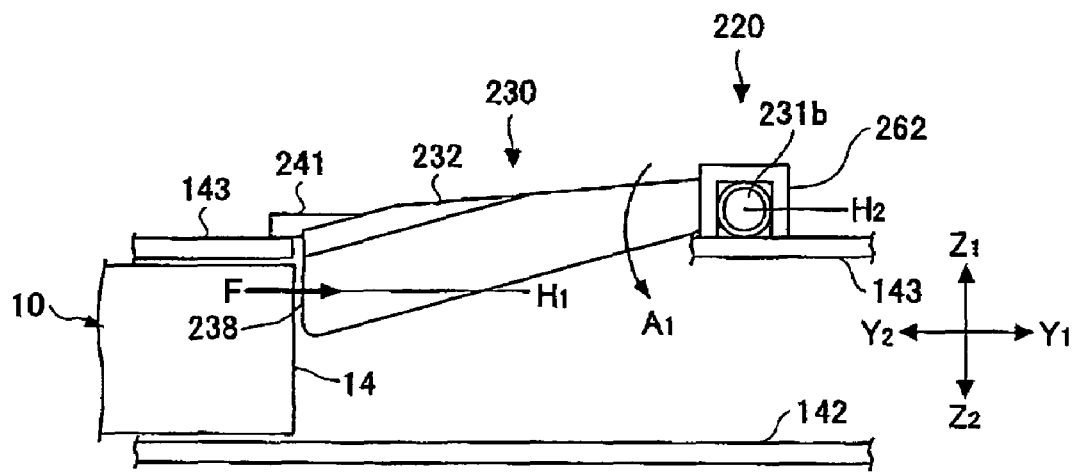

When an operator inserts the tape cartridge 10 from the mail slot 107 as shown in FIG. 1, the tape cartridge 10 is partially inserted into the turntable as shown in FIGS. 14A and 14B until the rear face 14 of the tape cartridge 10 contacts the vertical side face 238 of the tape cartridge stopper member 230.

The tape cartridge stopper member 230 receives a tape cartridge insertion force F by the operator at three points, that is, the bearing portions 262 and 263 and the holder portion 264. The tape cartridge stopper mechanism 220 has a rigid construction in this sense.

A height position H1 of the tape cartridge stopper member 230 to which the force F is applied is located at the Z2 side with respect to a height position H2 of the second shaft portion 231b. Accordingly, a moment applied to the tape cartridge stopper member 230 is in A1 direction (FIGS. 8A and 8B), that is, the direction in which the main body section 232 is rotated into the clearance 144 (FIG. 8B), but not in the direction in which the main body section 232 is rotated out of the clearance 144. The tape cartridge stopper mechanism 220 can therefore securely receive the tape cartridge insertion force F and impede full insertion of the tape cartridge 10 onto the turntable 140 when the turntable 140 is positioned at the first rotational angle.

Figure 17D:
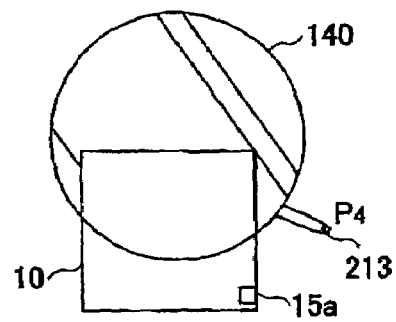
Figure 17B:
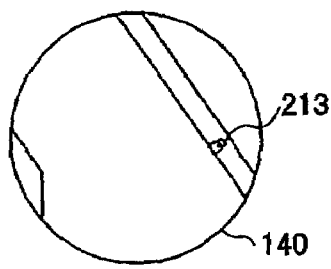
Figure 17E:
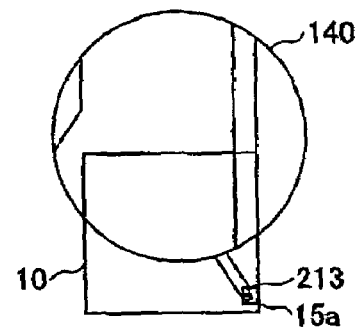
Figure 17C:
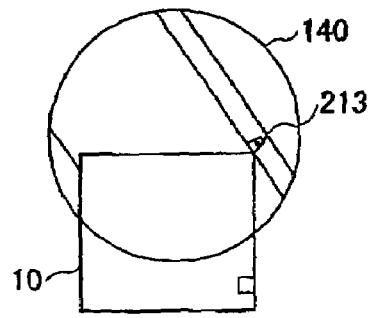

Accordingly, even if the operator inserts the tape cartridge 10 with a relatively strong force, the progress of the tape cartridge 10 is impeded, and the tape cartridge is positioned at a location shown in FIGS. 14A, 14B, and 17C, that is, full insertion onto the turntable 140 is inhibited.

Once the tape cartridge 10 is positioned, the cartridge pin 213 is moved out of the turntable 140 to the position P4 shown in FIG. 17D by the cartridge transporter 170.

Figure 15A:
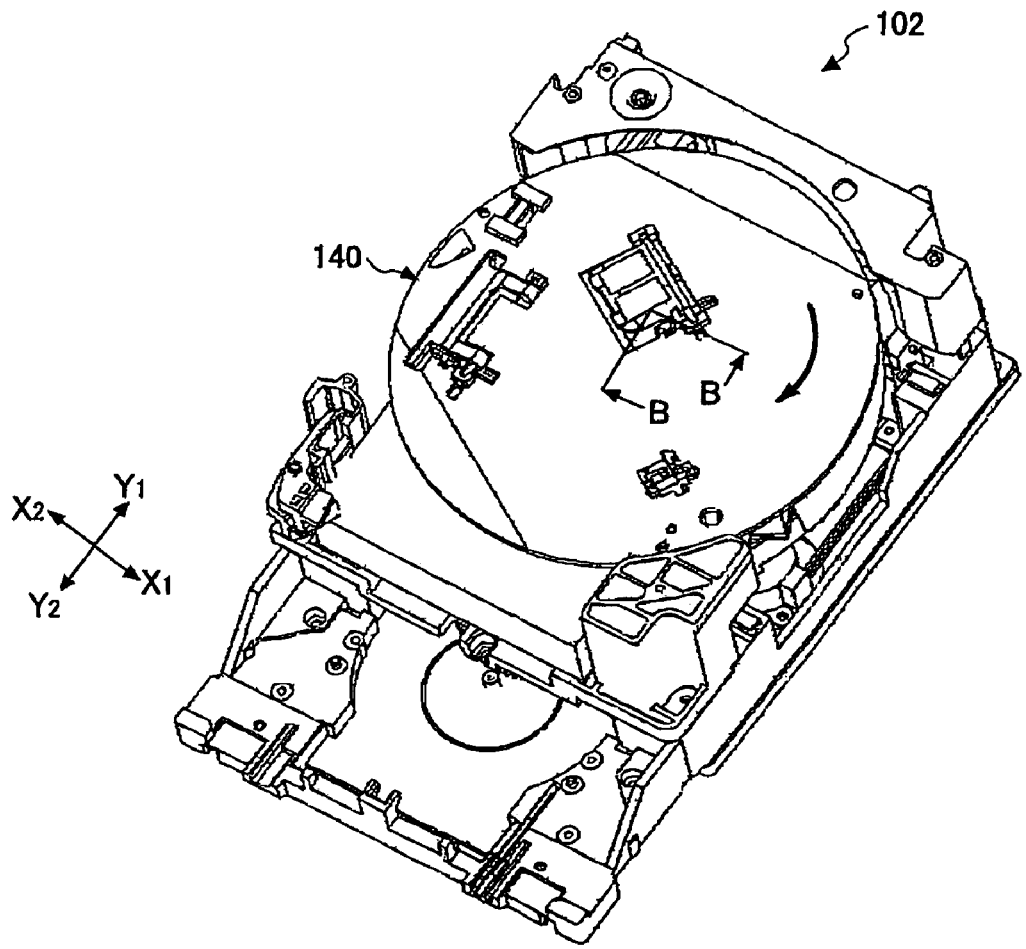
FIGS. 15A and 15B illustrate the state of the media cartridge stopper mechanism at the time when transportation of the media cartridge into the turntable is started.

Then, in this embodiment, the turntable 140 can be rotated by approximately 30 degrees clockwise, for example, by the turntable rotating mechanism 160 as shown in FIG. 15A. The turntable 140 is said to be positioned at a second rotational angle, which as set forth below, does not impede full insertion of the tape cartridge 10 onto the turntable 140. In one embodiment, the second rotational angle is rotation of the turntable in the opposite direction of the first rotational angle. Alternatively, the second rotational angle can be rotation of the turntable 140 any suitable increment in either direction, which can be the same as the first rotational angle, for example. In one embodiment, the second rotational angle is between zero and 180 degrees. In another embodiment, the second rotational angle is between 10 degrees and 90 degrees. In another embodiment, the second rotational angle is between 15 and 60 degrees. In yet another embodiment, the second rotational angle is between 20 degrees and 45 degrees. Importantly, the terms "first rotational angle" and "second rotational angle" are provided for ease of discussion, and it is recognized that these terms are used interchangeably provided the effects are different from one another as set forth herein.

Figure 15B:
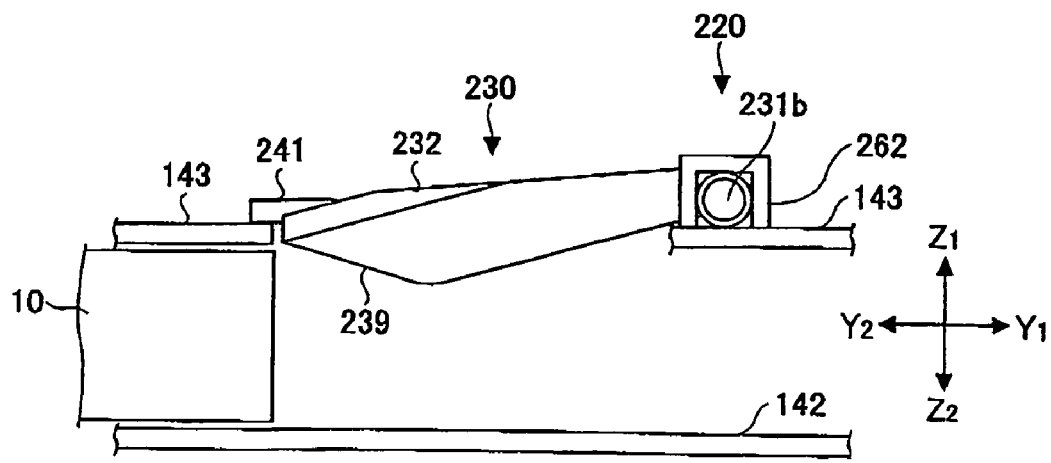

Thus, the inclined face 239 of the tape cartridge stopper member 230 faces the tape cartridge 10 as shown in FIG. 15B and does not impede full insertion of the tape cartridge 10, and the cartridge pin 213 engages the notch 15a of the tape cartridge 10 as shown in FIG. 17E. Since the tape cartridge stopper mechanism 220 is rigid as explained above, the tape cartridge 10 is accurately positioned at a predetermined location even if the operator inserts the tape cartridge 10 with a strong force. The cartridge pin 213 therefore securely engages the notch 15a.

Figure 16A:
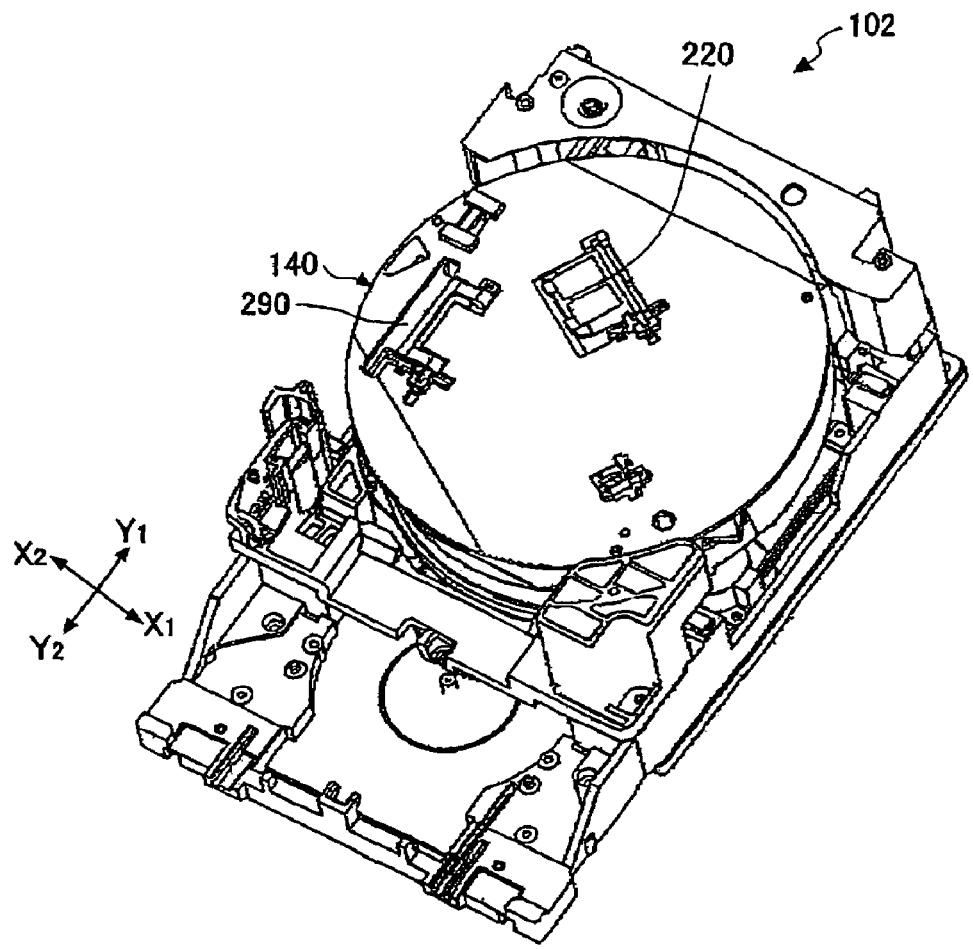
FIGS. 16A and 16B illustrate the state of the media cartridge stopper mechanism at the time when the transportation of the media cartridge into the turntable is completed.
Figure 16B:
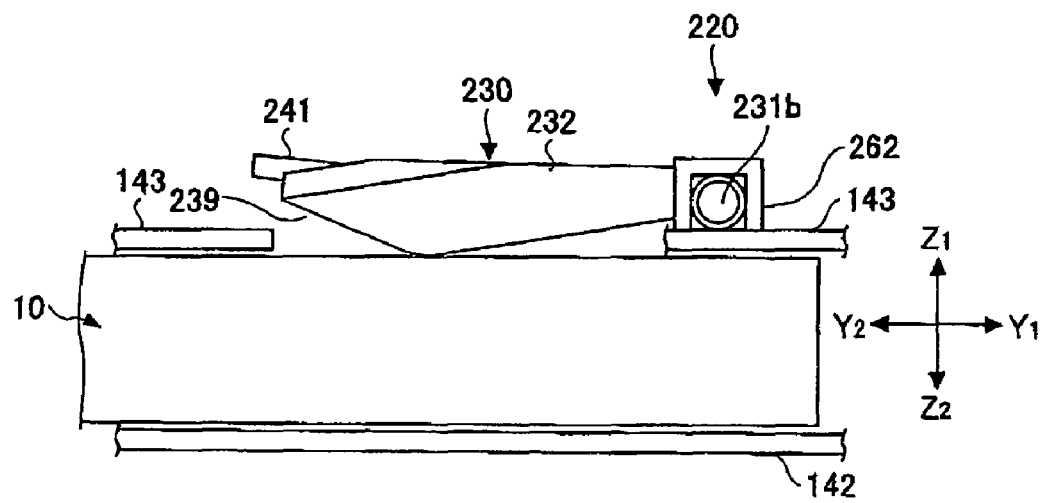
Figure 17F:
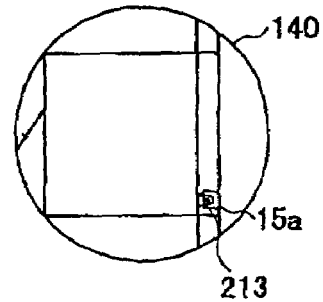

In the last step, the cartridge transporter 170 operates so as to have the state as shown in FIGS. 16A, 16B, and 17F. Specifically, the tape cartridge 10 is transported in the Y1 direction to be located completely inside the turntable 140 by the cartridge transporter 170 while contacting the inclined face 239 of the tape cartridge stopper member 230 to push up the tape cartridge stopper member 230 in the Z1 direction.

The tape cartridge 10 is transported toward the center of the turntable 140 while being guided by guide members 280 and 281 (FIG. 4) fixed to the base plate 141 and a guide member 290 (FIG. 8A) attached on the top plate 143.

The guide member 290 is attached on the upper face of the top plate 143, and includes a guide section 291 (FIG. 11) that is biased by a spring (not shown) to project in a direction substantially toward the floor plate 142. The guide section 291 has a shape that does not impede insertion of the tape cartridge 10 by the operator.

The present application is based on Japanese Priority Application No. 2005-269193 filed on Sep. 15, 2005, with the Japanese Patent Office, the entire contents of which are hereby incorporated by reference.

While the particular autoloader 100 as herein shown and disclosed in detail is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A media cartridge autoloader comprising:
   at least one mail slot through which a media cartridge is inserted and ejected;
   at least one media drive into which the media cartridge is loaded;
   at least one media cartridge storage section that stores the media cartridge; and
   a media cartridge picker including
      a turntable that supports the media cartridge and rotates to change the orientation of the media cartridge;
      a turntable rotating mechanism that rotates the turntable; and
      a media cartridge transporter that transports the media cartridge between the turntable and one of the mail slot, the media drive and the cartridge storage section;
   wherein the turntable is provided with a media cartridge stopper member capable of stopping the media cartridge inserted manually from the mail slot, the media cartridge stopper member including
      a main body section having a rectangular shape and including
         a first side surface to stop a further insertion of the media cartridge when the media cartridge is manually inserted and brought into contact with the first side surface; and
         a second side surface adjacent to the first side surface to permit the further insertion of the media cartridge; and
      a shaft including
         a first shaft portion formed along a third side surface of the main body section that opposes the first side surface and is adjacent to the second side surface; and
         second and third shaft portions projecting from the opposing ends of the first shaft portion; and
      the media cartridge stopper member is attached by engaging the second and third shaft portions into the turntable.

2. The media cartridge autoloader as claimed in claim 1, wherein the turntable includes
   a base plate; and
   a top plate disposed at the upper side of the base plate, allowing a clearance between the base plate and the top plate to accommodate the media cartridge, the top plate including
      bearing portions on an upper face of the top plate to support the second and third shaft portions of the shaft of the media cartridge stopper member;
   the media cartridge stopper member is arranged such that the second and third shaft portions of the shaft of the media cartridge stopper member engage the corresponding bearing portions of the top plate, and that the main body section of the media cartridge stopper member engages an opening formed in the top plate to have the first side surface of the main body section project toward the lower side of the top plate; and a moment produced by the contact between the media cartridge manually inserted from the mail slot and the first side surface of the main body section acts on the media cartridge stopper member in a direction such that the main body section is rotated toward the lower side of the top plate.

3. The media cartridge autoloader as claimed in claim 2, wherein the top plate of the turntable further includes
   a holder portion disposed between the bearing portions to support the first shaft portion; and
   the bearing portions and the holder portion receive a force applied to the media cartridge stopper member when the media cartridge manually inserted from the mail slot is brought into contact with the first side surface of the main body section of the media cartridge stopper member.

4. The media cartridge autoloader comprising:
   a mail slot through which a media cartridge is inserted;
   a media drive that receives the media cartridge;
   a media cartridge storage section that stores the media cartridge; and
   a media cartridge picker Including a turntable that supports the media cartridge, a turntable rotating mechanism that rotates the turntable, and a media cartridge transporter that transports the media cartridge between the turntable and one of the mail slot, the media drive and the cartridge storage section, the turntable including a media cartridge stopper member that selectively impedes full insertion of the media cartridge through the mail slot, the media cartridge stopper member including a first side surface that contacts the media cartridge to impede full insertion of the media cartridge through the mail slot when the turntable is positioned at a first rotational angle relative to the mail slot, and a second side surface that allows full insertion of the media cartridge through the mail slot when the turntable is positioned at a second rotational angle relative to the mail slot,
   wherein the media cartridge stopper member includes a third side surface and a shaft having a first shaft portion formed along the third side surface, the third side surface opposing the first side surface and being adjacent to the second side surface.

5. The media cartridge autoloader as claimed in claim 4, wherein the media cartridge stopper member includes second and third shaft portions that project from the first shaft portion, at least one of the second and third shaft portions securing the media cartridge stopper member to the turntable.

6. The media cartridge autoloader as claimed in claim 4, wherein the media cartridge stopper member includes (i) a main body section that includes the first side surface and the second side surface, and (ii) the shaft is coupled to the main body section, the shaft having an axis of rotation about which the main body section rotates.

7. The media cartridge autoloader as claimed in claim 4, wherein the turntable includes a turntable clearance that receives the media cartridge, and wherein contact between the media cartridge and the first side surface does not cause rotation of the main body section in a direction away from the turntable clearance.

8. The media cartridge autoloader as claimed in claim 7, wherein contact between the media cartridge and the second side surface causes rotation of the main body section away from the turntable clearance.

9. The media cartridge autoloader as claimed in claim 4, wherein the second side surface contacts the media cartridge during insertion.

* * * * *